United States Patent [19]
Beard

[11] Patent Number: 5,627,412
[45] Date of Patent: May 6, 1997

[54] DYNAMICALLY SWITCHABLE POWER SUPPLY

[75] Inventor: Paul Beard, Milpitas, Calif.

[73] Assignee: Norand Corporation, Cedar Rapids, Iowa

[21] Appl. No.: 486,812

[22] Filed: Jun. 7, 1995

Related U.S. Application Data

[63] Continuation-in-part of Ser. No. 399,060, Mar. 8, 1995, which is a continuation-in-part of Ser. No. 335,209, Nov. 7, 1994, abandoned.

[51] Int. Cl.$^6$ .................. H02J 1/00; H02J 3/00; H02J 1/10; H02M 7/00
[52] U.S. Cl. .................. 307/82; 307/80; 307/58; 363/65
[58] Field of Search .................. 363/65; 307/82, 307/86, 87, 55, 58, 80; 395/750

[56] References Cited

U.S. PATENT DOCUMENTS

| | | | |
|---|---|---|---|
| 4,254,475 | 3/1981 | Cooney et al. | 364/900 |
| 4,885,521 | 12/1989 | Crampton | 320/14 |
| 5,053,943 | 10/1991 | Yokoyama | 364/200 |
| 5,142,684 | 8/1992 | Perry et al. | 395/750 |
| 5,179,493 | 1/1993 | Imanishi | 361/91 |
| 5,257,202 | 10/1993 | Feddersen et al. | 364/498 |
| 5,300,835 | 4/1994 | Assar et al. | 307/475 |
| 5,307,257 | 4/1994 | Fukushima | 363/53 |
| 5,402,524 | 3/1995 | Bauman et al. | 395/50 |
| 5,475,847 | 12/1995 | Ikeda | 395/750 |
| 5,483,464 | 1/1996 | Song | 364/492 |
| 5,515,134 | 5/1996 | Taguchi | 354/484 |

*Primary Examiner*—Peter S. Wong
*Assistant Examiner*—Bao Q. Vu
*Attorney, Agent, or Firm*—McAndrews, Held & Malloy, Ltd.

[57] ABSTRACT

A power supply system of an electronic system is dynamically switchable upon fluctuating demand for operational power. The power supply is capable of providing multiple voltage values to an electronic system which is capable of utilizing multiple logical voltage values. The power utilized by the electronic system is further controlled by varying the frequency at which the electronic system operates. Power is conserved by operating at a lower voltage and frequency and is optimally utilized upon demand by dynamically switching to operate at higher voltages and frequencies for the duration of the increased power demand. Temporary peak power greater than average operational power may be attained.

24 Claims, 1 Drawing Sheet

DYNAMICALLY SWITCHABLE POWER SUPPLY

CROSS-REFERENCE TO RELATED APPLICATIONS

The present invention is a continuation-in-part of U.S. application Ser. No. 08/399,060, filed Mar. 8, 1995, which in turn is a continuation-in-part of U.S. application Ser. No. 08/335,209, filed Nov. 7, 1994, abandoned.

TECHNICAL FIELD

The present invention relates generally to power supplies for portable electronic devices having multiple operational voltage levels and specifically to a dynamically switchable power supply for portable electronic devices which operate at multiple logic voltage levels.

BACKGROUND OF THE INVENTION

The invention herein is a further improvement of related subject matter contained in the cross-referenced prior patent applications, which prior patent applications are relied upon for priority rights in previously described novel features.

Computer systems are becoming increasingly more portable while at the same time becoming increasingly more powerful. Low power consumption is an essential design criterion of portable battery powered computer systems and data terminals. For this reason much of the hardware in a portable computer system, such as the system microprocessor, operates at lower logical voltage supply levels, typically 3.3 volts or even 2.7 volts, because systems operating at lower voltages consume less power than systems operating at higher voltages. The most common computer hardware devices operate at 5.0 volts for logic voltage levels. Portable data terminals and other laptop type computer systems employ microprocessors and other hardware devices which operate at 3.3 volts or 2.7 volts for logic voltage levels in order to reduce system power consumption and thereby extend operational battery time.

As the logical switching speeds of computer systems increase, the amount of heat generated as a result also increases. It is for this reason that microprocessor chip manufacturers have needed to lower the logical operating voltages with increased processor speeds because even with heat sinks and fans to cool them, high operating speeds combined with high voltages will cause the chip to overheat.

If proper thermal management of the electronics of a portable electronic device are not carefully considered and engineered for, catastrophic thermal failure may occur resulting in a total loss of electronic function. In general, for a capacitive load, the relationship between the power generated by an electronic device and the operational voltage and frequency is given as:

$$P \propto v^2 f$$

where P is the power generated, v is the operational voltage and f is the operational frequency. Therefore, with increased operational frequencies, it is desirable to correspondingly decrease the operational voltage in order to minimize the power (and thereby the heat) generated by the electronic device. However, the dichotomy of decreasing the operational voltage of an electronic device operating at high frequencies is that the switching speeds of electronic devices operating at lower voltages are slowed as a result of the lower voltages. Thus, it is difficult to obtain high frequency operation of an electronic device with simultaneous low power operation.

Because maintaining low power consumption and preserving battery energy are important design criteria in portable data terminal systems, the dynamics of delivering power in multiple supply logic voltage computer systems must be taken into account. For example, the powering up of the system hardware devices requires more power than the average power consumed during normal operations, and therefore it is of great advantage to preserve battery energy by minimizing power consumption during system startup. A prudently designed power supply system for mixed logic voltage level computer hardware may consider the order in which the devices are powered up and the system hardware is reset.

Electronic devices are often rated according to their speed-power product, which is the average switching time multiplied with the average power dissipation. Energy may be conserved in multiple supply logic voltage computer systems by dynamically altering the clock speed of the system according to the processing needs of the system. By keeping the clock speed nominally low and increasing the speeds when applications demand higher speeds, the amount of energy generated and dissipated by the electronic systems may be minimized. Additionally, energy may be conserved by dynamically altering the operational logic voltage levels accordingly with required operational clock speed. Operational power levels above average rated power levels may be attained for momentary periods without damage to the electronic systems.

For the foregoing reasons, there is a need for a power supply system in multiple logic voltage computer systems that dynamically varies the logic voltage levels and operational frequency at which the particular circuitry operate according to the demands of a particular application in order to minimize power consumption in a hand held portable electronic system.

Thus, despite the intense efforts of those skilled in the art, there still exists a need for a power supply which is capable of dynamically switching the operational voltage and operational frequency in a multiple logic voltage level electronic system.

SUMMARY OF THE INVENTION

The present invention provides a dynamically switchable power supply which varies the operational frequency and operational voltage of an electronic system such that power consumption is minimized when high performance is not required and power utilization is maximized upon demand in an electronic system.

In a preferred embodiment an electronic system may dynamically switch operational voltages from a nominal 2.7 volts up to 3.3 volts or 5.0 volts when required. The electronic system may correspondingly vary the operational frequency from 40 MHz to 60 MHz or 80 MHz on demand.

BRIEF DESCRIPTION OF THE DRAWINGS

The numerous objects and advantages of the present invention may be better understood by those skilled in the art by reference to the accompanying figures in which.

DETAILED DESCRIPTION OF AN EXEMPLARY EMBODIMENT

Figure 1:
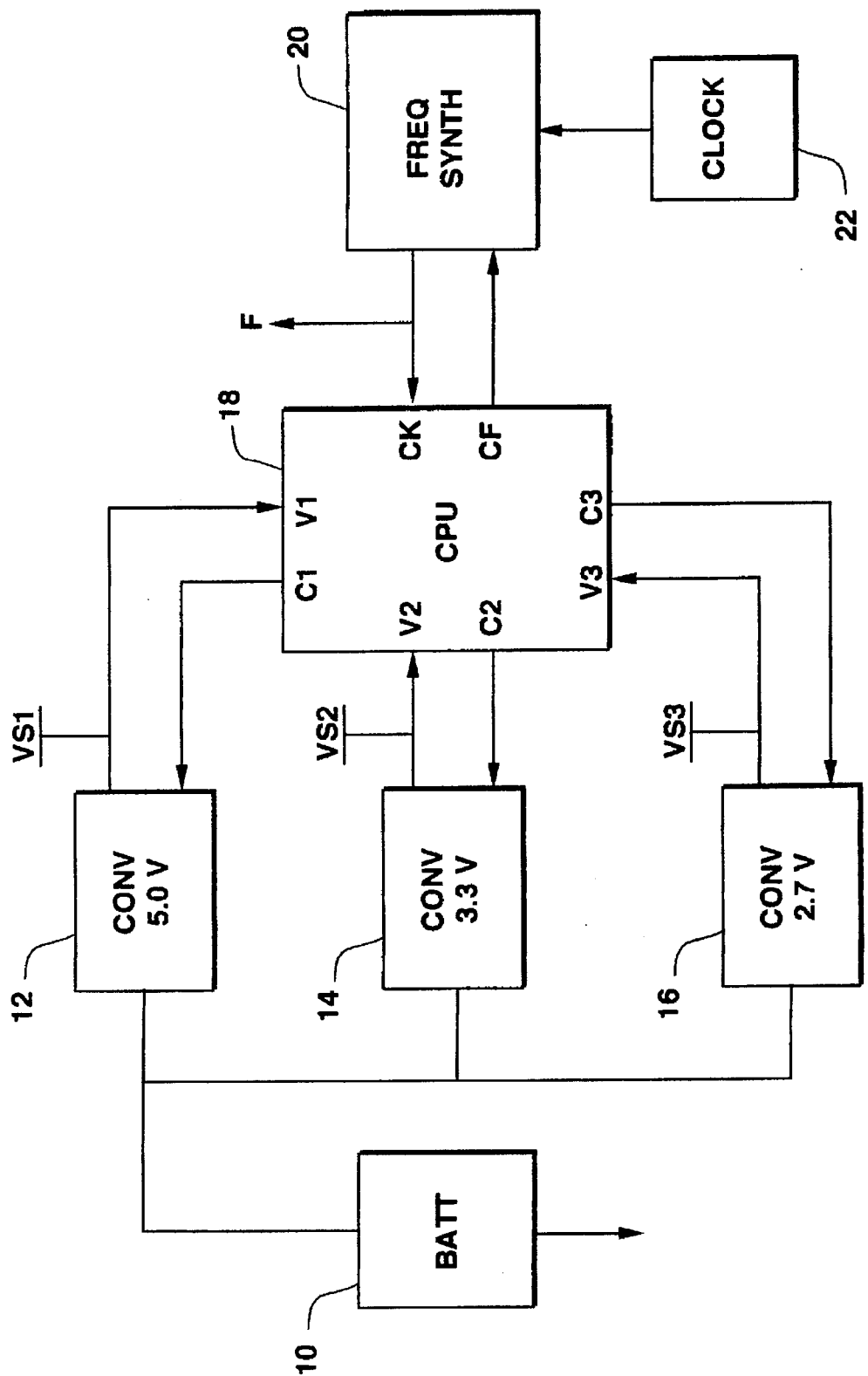
FIG. 1 is a block diagram of an exemplary embodiment of the present invention.

FIG. 1 depicts a preferred embodiment of the present invention. FIG. 1 shows an arrangement for a dynamically adjustable multiple logic level, multiple frequency power supply which is capable of providing multiple logic voltage levels in a multiple logic voltage level system. Additionally, the embodiment of the present invention shown in FIG. I is capable of providing a variable clock frequency timing control signal for control of logic circuits requiring a clock signal.

A battery (BATT) 10 preferably provides a direct current voltage and is the primary source of energy for a portable electronic device in which the present invention may be utilized. The battery 10 preferably comprises some type of rechargeable cells such as nickel-cadmium, nickel-metal hydride, or lithium ion, for example. The battery 10 provides a direct current voltage to the multiple voltage convertors: a 5.0 volt convertor (CONV 5.0 V) 12, a 3.3 volt convertor (CONV 3.3 V) 14 and a 2.7 volt convertor (CONV 2.7 V) 16. The voltage convertors 12, 14 and 16 receive a direct current input voltage from the battery 10 whose voltage is generally poorly specified (i.e. fluctuates over a large percentage of its nominal voltage) and provide a constant, regulated output voltage which is well specified at a particular logic and supply voltage for other circuits (e.g. 5.0 V, 3.3 V, 2.7 V). The present invention also contemplates other combinations of operating logic voltages.

A central processing unit (CPU) 18 preferably functions as the main control unit of a portable electronic system. The CPU 18 may be one of various types of microprocessors, microcontrollers or digital signal processors. The CPU 18 receives operational voltages from the voltage convertors 12, 14 and 18. The CPU 18 is preferably a microprocessor which is capable of operating at multiple operational voltages, available from Advanced Micro Devices. The CPU 18 may receive a 5.0 volt operational voltage at input V1 from the 5.0 volt convertor 12, a 3.3 volt operational voltage at input V2 from the 3.3 volt convertor 14, and a 2.7 volt operational voltage at input V3 from the 2.7 volt convertor 16. The CPU preferably has a control output C1 to control the 5.0 volt convertor 12, a control output C2 to control the 3.3 volt convertor 14, and a control output C3 to control the 2.7 volt convertor 16. The voltage convertors 12, 14 and 16 may provide respective supply voltages VS1, VS2 and VS3 to the electronic system in which the present invention is utilized.

The CPU 18 may also have a clock signal input CK to receive a timing control signal which controls the frequency of operation of the CPU 18. The clock signal input CK to the CPU 18 is preferably provided by a frequency synthesizer (FREQ SYNTH) 20 which receives a fixed clock signal from a clock circuit (CLOCK) 22. The frequency synthesizer 20 receives the signal from the clock 22 and provides a timing control output signal by multiplying or dividing the frequency of the signal from the clock 22.

The clock 22 preferably provides a nominal frequency of 20 MHz which may be doubled to 40 MHz, tripled to 60 MHz or quadrupled to 80 MHz, for example, by the frequency synthesizer 20. The frequency of the timing control signal output from the frequency synthesizer 20 is preferably controlled by the CPU 18 with a frequency control signal CF. The frequency synthesizer 20 may provide a timing control signal F to the electronic system in which the present invention is utilized.

The power supply system so arranged is capable of conserving the energy consumed by the electronic system thereby extending the life of the battery 10 between recharge cycles. In an exemplary embodiment of the present invention, the system may nominally operate in a low power mode wherein the processor 18 runs at 2.7 volts and 40 MHz. The 2.7 volt operational voltage is sufficient to maintain the data in memory systems utilizing CMOS technology. When an application demands more processing speed and power, for example, the CPU may recognize the demand and raise the operational voltage to 3.3 volts and the operational frequency to 60 MHz for the duration of the application. If an application demands even greater speed and power, the CPU may recognize the greater demand and switch the operational voltage to 5.0 volts and the operational frequency to 80 MHz for the duration of the demand for higher power. Alternatively, the power levels may be user selectable, or may be monitored and controlled by a fuzzy logic routine which manages the power supply system in the background of operations of the processor 18.

The electronic system thus described may dynamically switch to momentarily operate at power and speed levels well above the rated average power levels for the processor and the electronic system while at the same time consuming less energy in the long run than if the voltage and frequency levels were fixed or semipermanently set. As a result, battery life is extended, a smaller sized heat sink or cooling fan for the CPU may be used, and higher processing power may be achieved for a given system.

In view of the above detailed description of a preferred embodiment and modifications thereof, various other modifications will now become apparent to those skilled in the art. The claims below encompass the disclosed embodiments and all reasonable modifications and variations without departing from the spirit and scope of the invention.

What is claimed is:

1. A dynamically switchable power supply in an electronic system having varying power requirements, said dynamically switchable power supply comprising:
   (a) a central processing unit, said central processing unit capable of operating at a plurality of voltages;
   (b) a plurality of voltage converters, said plurality of voltage converters supplying a plurality of operational voltages to said central processing system and to the electronic system;
   (c) a frequency synthesizer, said frequency synthesizer providing a timing control signal of multiple variable frequencies to said central processing unit and to the electronic system; and
   (d) said central processing unit capable of dynamically switching the supply of operational voltages from said voltage converters and the timing control signal of said frequency synthesizer supplied to said central processing unit and to the electronic system wherein operational voltages and the timing control signals are selected according to the varying power requirements of the electronic system such that power consumption of the electronic system is minimized.

2. The dynamically switchable power supply of claim 1 wherein said central processing unit is capable of operating at 5.0 volts.

3. The dynamically switchable power supply of claim 1 wherein said central processing unit is capable of operating at 3.3 volts.

4. The dynamically switchable power supply of claim 1 wherein said central processing unit is capable of operating at 2.7 volts.

5. The dynamically switchable power supply of claim 1 wherein said plurality of voltage convertors includes a 5.0 volt convertor.

6. The dynamically switchable power supply of claim 1 wherein said plurality of voltage convertors includes a 3.3 volt convertor.

7. The dynamically switchable power supply of claim 1 wherein said plurality of voltage convertors includes a 2.7 volt convertor.

8. The dynamically switchable power supply of claim 1 wherein said switching means is controlled with said central processing unit.

9. The dynamically switchable power supply of claim 1 wherein said switching means is user controlled.

10. The dynamically switchable power supply of claim 1 wherein said switching means is controlled with a fuzzy logic routine.

11. A method of controlling a dynamically switchable power supply in an electronic system comprising:
(a) nominally operating the system at a first operational voltage value and a first operational frequency value whereby the electronic system operates at a first power level;
(b) switching the operational voltage to a second voltage value and the operational frequency to a second frequency value upon a change in the required operational power whereby the electronic system operates at a second power level; and
(c) resetting the operational voltage to the first operational voltage value and the operational frequency to the first operational frequency value whereby the electronic system operates at the first power level.

12. The method of claim 11 further including the step of switching the operational voltage to a third voltage value and the operational frequency to a third frequency value upon a change in the required operational power whereby the electronic system operates at a third power level.

13. The method of claim 11 wherein said switching step is controlled by a central processing unit.

14. The method of claim 11 wherein said switching step is user controlled.

15. The method of claim 11 wherein said switching step is implemented by a fuzzy logic routine.

16. In a portable electronic device having electronic circuits operationally powered from a battery power source, a dynamically switchable power supply comprising:
(a) a battery for providing operational power to the electronic circuits of the portable electronic device;
(b) a first voltage converter operationally powered by said battery, said first voltage converter for providing a first regulated dc supply voltage to the electronic circuits of the portable electronic device;
(c) a second voltage converter operationally powered by said battery, said second voltage converter for providing a second regulated dc supply voltage to the electronic circuits of the portable electronic device; and
(d) means for controlling said first and said second voltage converters wherein said first and said second voltage converters may be dynamically activated or deactivated such that the regulated dc supply voltage provided to the electronic circuits of the portable electronic device may be thereby selected to control the operational power provided by said battery to the electronic circuits of the portable electronic device.

17. The dynamically switchable power supply of claim 16 wherein said controlling means is a central processing unit operatively integrated with the electronic circuits of the portable electronic device.

18. The dynamically switchable power supply of claim 17 wherein said central processing unit is capable of operating from at least two dc supply voltage levels.

19. In a portable electronic device having electronic circuits operationally powered from a battery power source, a dynamically switchable power supply comprising:
(a) a battery for providing operational power to the electronic circuits of the portable electronic device;
(b) a frequency synthesizer for providing a variable driving frequency to the electronic circuits of the portable electronic device; and
(c) means for controlling said frequency synthesizer wherein the variable driving frequency of said frequency synthesizer may be thereby dynamically adjusted to control the operational power provided by said battery to the electronic circuits of the portable electronic device.

20. The dynamically switchable power supply of claim 19 wherein said controlling means is a central processing unit operatively integrated with the electronic circuits of the portable electronic device.

21. The dynamically switchable power supply of claim 20 wherein said central processing unit is capable of operating from at least two dc supply voltage levels.

22. In a portable electronic device having electronic circuits operationally powered from a battery power source, a dynamically switchable power supply comprising:
(a) a battery for providing operational power to the electronic circuits of the portable electronic device;
(b) a first voltage converter operationally powered by said battery, said first voltage converter for providing a first regulated dc supply voltage to the electronic circuits of the portable electronic device;
(c) a second voltage converter operationally powered by said battery, said second voltage converter for providing a second regulated dc supply voltage to the electronic circuits of the portable electronic device;
(d) a frequency synthesizer for providing a variable driving frequency to the electronic circuits of the portable electronic device; and
(e) means for controlling said first and said second voltage converters and said frequency synthesizer wherein said first and said second voltage converters may be dynamically activated or deactivated such that the regulated dc supply voltage provided to the electronic circuits of the portable electronic device may be thereby selected and wherein the variable driving frequency of said frequency synthesizer may be thereby dynamically adjusted to control the operational power provided by said battery to the electronic circuits of the portable electronic device.

23. The dynamically switchable power supply of claim 22 wherein said controlling means is a central processing unit operatively integrated with the electronic circuits of the portable electronic device.

24. The dynamically switchable power supply of claim 23 wherein said central processing unit is capable of operating from at least two dc supply voltage levels.

* * * * *